US005537104A

United States Patent [19]

Van Dort et al.

[11] Patent Number: 5,537,104

[45] Date of Patent: Jul. 16, 1996

[54] SYSTEM FOR EQUIPMENT CONTROL, COMPRISING A COMMON COMMUNICATION CHANNEL

[75] Inventors: Erik J. Van Dort; Handoko Kohar, both of Eindhoven, Netherlands

[73] Assignee: U.S. Philips Corporation, New York, N.Y.

[21] Appl. No.: 456,019

[22] Filed: May 31, 1995

Related U.S. Application Data

[63] Continuation of Ser. No. 974,027, Nov. 10, 1992, abandoned.

[30] Foreign Application Priority Data

Nov. 11, 1991 [EP] European Pat. Off. .............. 91202937

[51] Int. Cl.$^6$ .............................. H04Q 7/00; G05B 23/02

[52] U.S. Cl. ............................ 340/825.520; 340/825.070; 340/825.22; 340/825.69; 307/38

[58] Field of Search ......................... 340/825.52, 825.06, 340/825.07, 825.09, 825.72, 825.24, 825.25, 825.69; 307/38, 29, 40

[56] References Cited

U.S. PATENT DOCUMENTS

| | | | |
|---|---|---|---|
| 4,429,384 | 1/1984 | Kaplinsky | 370/85 |
| 5,039,980 | 8/1991 | Aggers et al. | 340/825.52 |
| 5,107,256 | 4/1992 | Ueno et al | 340/825.07 |
| 5,109,222 | 4/1992 | Welty | 340/825.72 |
| 5,132,679 | 7/1992 | Kubo et al. | 340/825.72 |
| 5,210,841 | 5/1993 | Johnson . | |
| 5,255,180 | 10/1993 | Shinoda et al. | 340/825.69 |
| 5,382,947 | 1/1995 | Thaler et al. | 340/825.69 |
| 5,436,510 | 7/1995 | Gilbert | 307/38 |
| 5,457,446 | 10/1995 | Yamamoto | 340/825.24 |
| 5,483,230 | 1/1996 | Mueller | 340/825.07 |

FOREIGN PATENT DOCUMENTS 8904578 5/1989 WIPO .

OTHER PUBLICATIONS

"Batibus: Intelligentie Via 'Twisted Pair'", RB Elektronica, Oct. 1991 pp. 38–40, Published By 'De Muiderkring Bv' Weesp, The Netherlands.

Gutzwiller, Control Networks for the Home, Oct., 1983 pp. 109–112, Machine Design Magazine.

*Primary Examiner*—Brian Zimmerman
*Assistant Examiner*—Edward Merz
*Attorney, Agent, or Firm*—Edward Blocker

[57] ABSTRACT

A system for equipment control comprises a plurality of equipment units and actuator units. These units are linked by a common communication channel, for example a wired bus. Each of the units has a unique address and further associated with a programmable memory for storing therein an event table. The event table comprises event fields, and associated address fields and instruction fields. When the unit changes state—called an event—addresses of other units and corresponding instructions are retrieved from the event table and transmitted to said other units via the common communication channel. The transmitted instructions cause the corresponding other units to change state, for example to be switched on or off.

11 Claims, 4 Drawing Sheets

SYSTEM FOR EQUIPMENT CONTROL, COMPRISING A COMMON COMMUNICATION CHANNEL

This is a continuation of application Ser. No. 07/974,027, filed Nov. 10, 1992, now abandoned.

BACKGROUND OF THE INVENTION

The invention relates to a system for equipment control, comprising a plurality of equipment and actuator units, and a common communication channel. The equipment and actuator units being provided with means for comprising a unit address.

Such a system can be used in a living or working environment to establish a flexible configuration for interactions between different pieces of equipment and actuators for controlling the equipment. In the framework of the present invention an equipment unit is any device present in a home, shop or other place that can be controlled according to messages on a communication channel. Examples of such equipment are lights, equipment for heating and air conditioning, video and audio apparatus, intruder alarm, application controller, and domestic appliances such as a washing machine or a coffee-maker. An actuator unit is any device that may send messages into the communication channel to switch or adjust an equipment unit in response to external changes. Actuator units comprise wall switches, sensors, timers and remote control units. In its simplest form, activation of an actuator unit will switch on or off an equipment unit.

A system according to the introductory paragraph is the BariBUS system commercialized by the company Merlin Gerin, Meylan, F-38240 France. A description of this system is given in the Article "BatiBUS: intelligentie via 'twisted pair'√, in the magazine RB Elektronica, October 1991, p 38–40, published by 'De Muiderkring BV', Weesp, The Netherlands. In the BatiBUS system equipment and actuator units are linked to each other by assigning to them the same address. Such address has to be given by an operator by means of hardware switches on each individual equipment unit. The operator needs to take considerable care not to confuse addresses. A reconfiguration of the system needs a careful preparation in order to assign a unique address to each group of cooperating equipment and actuator units. As a unit can have only one address, and the logical connection between actuators and equipment is established via the address, it is not possible to link partially overlapping groups of equipment to different actuators. For example, it is not possible to switch two lights with a first actuator and to link a second actuator with only one of the two lights together with other pieces of equipment. A further disadvantage of this known system is that there must be prior knowledge in the system of the type of equipment and actuator units possible and the way they cooperate when linked together. The need for prior knowledge inhibits an easy extension of the system with pieces of equipment of a new type.

SUMMARY OF THE INVENTION

It is, inter alia, an object of the invention to provide a system for the control of equipment in a working or living environment which is more flexible and requires less preparation when a reconfiguration of the system is desired, which allows partially overlapping groups of equipment units to be linked to different actuators and which can be easily extended with new types of equipment or actuators.

A system for equipment control in accordance with the invention is characterized in that each actuator unit is associated with a programmable memory for storing at least one programmable message and means for storing into the associated programmable memory the at least one message, and in that the system comprises means for emitting, in response to a change of state in an actuator unit, at least one of the messages stored in the programmable memory associated with that actuator unit via the common communication channel. In the programmable memories of the actuator units, unit addresses of the equipment units which are linked with the actuator will be stored, thereby establishing a logical connection between actuator and equipment units. As each actuator has its own associated memory and its own list of addresses of logically connected equipment units, partially overlapping groups of equipment units can be realized. As unit addresses and possibly further contents of the messages are to be stored in the programmable memory of an actuator, a new type of equipment can be inserted without problem as only the content of the programmable memory has to be changed or extended. When reconfiguring the system, the only action of the operator required is to indicate the logical link between actuator and equipment to the system. Unit addresses are preferably unique, however within the frame of the invention a number of units may have identical addresses. These units will be handled as a single unit and receive the same instructions. In practice, three units are switched in parallel. Alternatively, a group of equipment units may have unique but related addresses and a message can be directed to all units in such a group by using as a destination address a portion common to all units within the group.

In order to easily establish such logical links the system according to the invention is further characterized in that with each equipment unit mark-means is associated for marking the unit. The system further comprises means for generating a link-signal associated with at least one actuator unit and in that the system comprises coupling means for logically coupling the marked equipment units with the at least one actuator unit. The coupling means being arranged for storing messages comprising the addresses of the marked equipment in the programmable memories of the at least one actuator unit. By marking the units a list of addresses of equipment units is assembled. When a link-signal is generated this list of addresses is subsequently stored in the programmable memories of the actuator units associated with the link-signal. Preferably, also information or an instruction relating to the state the equipment is in at the time of marking or linking is equally stored in the programmable memory. Marking can also be established in other ways, for example, by setting mark-registers associated with the unit.

An alternative embodiment for easily establishing logical links is characterized in that with each actuator unit mark-means is associated for marking the unit, in that the system comprises means for generating a link-signal associated with at least one equipment unit, and in that the system comprises coupling means for logically coupling the marked actuator units with the at least one equipment unit. The coupling means being arranged for storing messages in the programmable memories of the marked actuator units comprising the addresses of the at least one equipment unit. In this embodiment a list of actuator addresses is established. Into each of the programmable memories of the selected actuators the address or addresses of the equipment units associated with the link-signal are subsequently stored.

A preferred embodiment of the system according to the invention is characterized in that with at least one equipment unit a programmable memory is associated for storing at least one programmable message and means for storing into the associated programmable memory the at least one message and means for emitting at least one of the stored messages via the common communication channel in response to a change of state in the unit. In this embodiment an equipment unit may act as an actuator. Equipment units and actuator units are not mutually exclusive. For example, an actuator may switch on a piece of equipment which then will operate till a predetermined condition occurs. When said condition occurs the equipment will behave as an actuator and control or switch another piece of equipment. An equipment unit that may behave as an actuator is, of course, provided with means to generate a link-signal.

This embodiment may be further characterized in that it comprises means for storing messages in the programmable memory of the at least one equipment unit, the messages comprising the addresses of the actuator units associated with the link signal. In circumstances, it may be advantageous that the actuator units which are logically coupled with the equipment unit receives a message when the equipment unit changes state. The message may cause a change of state in the actuator unit as well, for example, it may switch on or off an indicator in the actuator unit. In this embodiment this return link between equipment unit and actuator is established simultaneously with the forward link between actuator and equipment units, without operator action required.

An embodiment of the system in accordance with the invention may be further characterized in that the equipment and actuator units comprise a further programmable memory for storing the unit address and means for storing into the programmable memory a unit address. When an equipment or actuator unit is inserted in the system it receives a unit address via the communication channel. In the system a list of addresses assigned can be maintained and, consequently, the unit address may be unique.

This embodiment is further characterized in that the system comprises a central unit being arranged for assigning unit addresses to actuator and equipment units. The use of a central unit for assigning unit addresses to equipment and actuator units is advantageous as such a central unit can assemble a list of all addresses used, thereby avoiding the need for each equipment and actuator unit to be provided with means to assemble such a list when inserted into the system. Duplication of such means in all units and heavy communication on the common communication channel just after switching on a new unit is thereby avoided.

A preferred embodiment of the system according to the invention is further characterized in that it comprises a configuration unit comprising means for retrieving information about the interaction between equipment and actuator units from a background memory, the configuration unit further comprising means for submitting messages containing information retrieved from the background memory to the programmable memories associated with equipment and actuator units which are marked and to the equipment and actuator units associated with a link-signal, when a link-signal occurs. In this embodiment the messages emitted by an actuator may comprise instructions for the equipment unit for which the message is intended. As the actuator has no prior knowledge of the equipment unit, the instruction part of the message needs to be obtained from a source having knowledge of the set of possible instructions for that equipment unit, and stored in the programmable memory of the actuator unit. For this purpose the background memory in the configuration unit contains sets of instructions for the interaction or cooperation of the various types of actuator and equipment units in the system. Preferably the background memory can be updated in order to store therein additional sets of instructions when new types of actuators or equipment units become available. Updating is possible, for example when the background memory is an exchangeable memory such as an optical or magnetic disk. Alternatively each actuator or equipment unit may have a set of instructions describing with which available equipment and actuator units it may interact and how the interaction takes place. This set of instructions is added in the course of the installation of the new actuator or equipment unit added to the contents of the background memory. For example, the instructions may be available on a card with a magnetic strip or a chip card.

The mark- and link-signals and the signals for storing messages in the associated memories can be transmitted via the common communication channel to and from the configuration unit. Alternatively, as the configuration unit is necessary only for initialization and during reconfiguration of the system, a separate communication channel can be used which channel is switched off when no such reconfiguration takes place.

An embodiment of the system in accordance with the invention may be characterized in that the programmable memory associated with each actuator and equipment unit, respectively, is physically integrated with the unit. By placing the programmable memory of each unit in the unit itself, the common communication channel is not used for obtaining the messages that are to be sent from an actuator to an equipment unit or vice versa. Consequently, the load on the common communication channel is significantly reduced and the communication channel may be slower and cheaper. This is advantageous especially in applications with a large number of actuators and equipment units, such as office buildings.

An embodiment of the system according to the invention is characterized in that the mark-means in at least one equipment or actuator unit comprises a switch for marking the unit, the switch being associated with the unit. Analogous the system may be further characterized in that at least one equipment or actuator unit comprises a switch for generating a link-signal associated with said equipment or actuator unit. In these embodiments a close physical relation exists between the equipment or actuator unit and a switch for marking or generating a link-signal. For example, the switches may be buttons which are physically present on the housing of the actuator or equipment units. Alternatively, or in addition, the switches may be connected to a detector for remote control signals, for example infra-red, allowing the user to activate the switches remotely.

Then the system may be characterized in that the system comprises a remote control unit for remotely activating, by means of wireless transmission of a signal beam, the switches for marking a unit and for generating a link-signal, the remote control unit being arranged for emitting a signal beam in a selected direction only. The signal beam of the remote control is aimed at the equipment or actuator unit to be selected. For the purpose of marking and linking equipment and actuator units in the system a simple remote control unit with only two different signals is necessary.

The common communication channel can be an optical or electrical bus, an example of the latter is the D2B-bus, commercialized by the company D2B-systems in Redhill, England, which is described in U.S. Pat. No. 4,429,384.

Preferably at least part of the communication between equipment and actuator units is by wireless transmission of signals by way of radio frequency (RF) or infra-red (IR) transmission.

These, and other more detailed aspects of the invention will now be elucidated by way of example with reference to the accompanying drawings.

BRIEF DESCRIPTION OF THE DRAWINGS

For a fuller understanding of the invention, reference is had to the following description taken in connection with the accompanying drawings, wherein.

The drawings show in

DETAILED DESCRIPTION OF THE PREFERRED EMBODIMENTS

Figure 1:
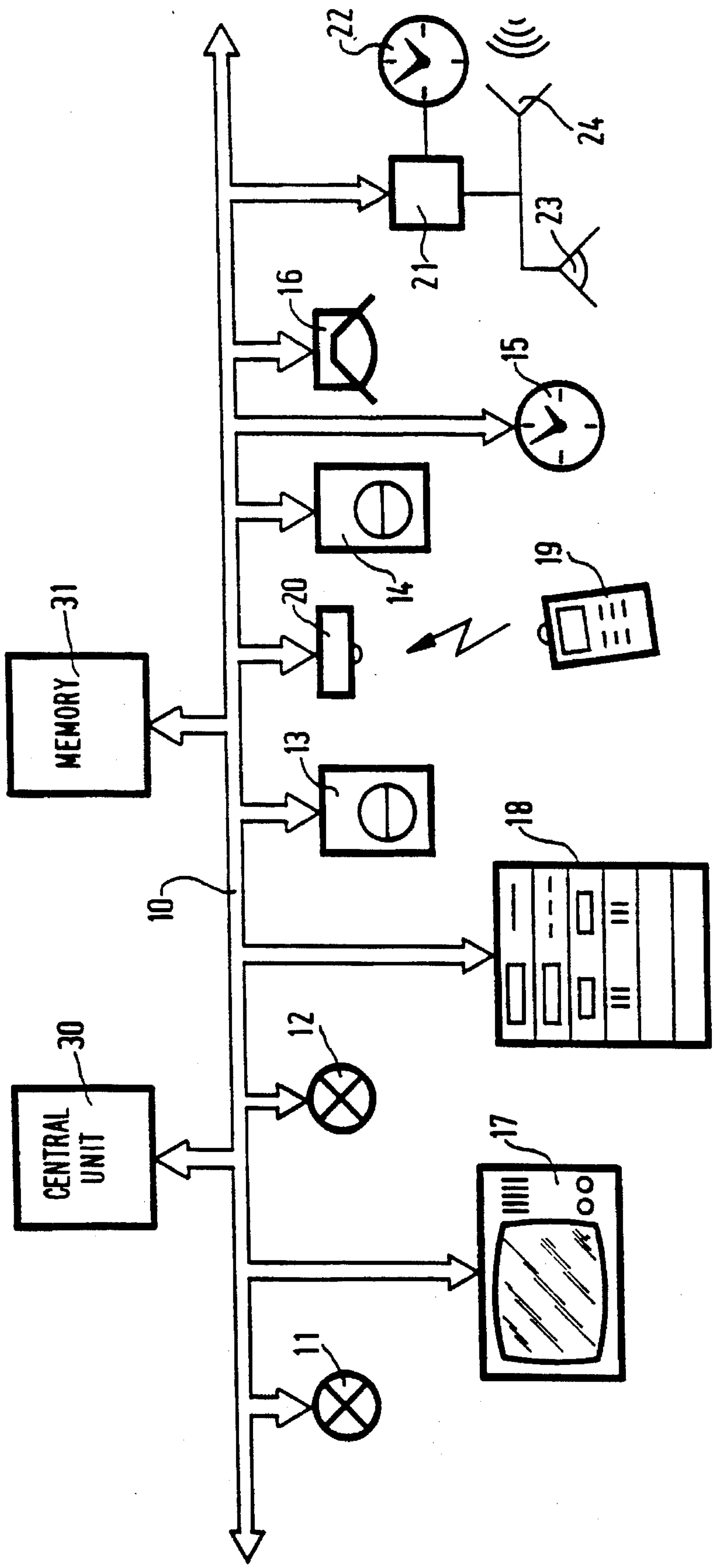
FIG. 1 diagrammatically a system in according to the invention, comprising a number of possible equipment units and actuator units.

In FIG. 1 an example of a system for the control of equipment according to the invention is shown. The system contains a common communication channel 10, for example a D2Bbus, which is coupled to a number of equipment and actuator units. Shown are two lights 11 and 12, two switches 13 and 14, a timer 15 which acts as a time-controlled switch, a movement detector 16, for example a IR- or sound detector, which behaves like a switch when any movement or noise is detected in its vicinity, video and audio equipment 17 and 18, a remote control unit 19 with a detector 20 and an application controller 21. The application controller 21 functions as an actuator reacting on a combination of different inputs, indicated are a timer 22, a IR-detector 23 and a sound detector 24. The inputs to the application controller may be directly connected as shown or communicate-with the application controller via the common communication channel 10. The communication channel 10 is further linked to a central unit 30 and to a memory unit 31. The function of the central unit 30 is to assign unit addresses to each of the actuator and equipment units in the system. The memory unit 31 comprises a programmable memory containing for each actuator unit an associated memory for storing therein the unit addresses of the equipment units to which the actuator unit is linked.

The system functions basically as follows. If an actuator changes state, the associated memory is accessed and messages are transmitted to the units of which an address is present in the associated memory. A message may contain merely the address of a destination equipment unit, may contain a general instruction or the message may be related to the specific change of state of the actuator unit. The equipment units to which a message is transferred will change their state in a way contained in or implied by the message.

Equipment units and actuator units are not mutually exclusive. For example, an actuator may switch on a piece of equipment which will operate till a predetermined condition occurs. When said condition occurs the equipment will behave as an actuator and switch another piece of equipment such as an alarm or an indicator on the original actuator unit. Consequently, in the system the actuator and equipment units are treated as equivalent. In this description distinction is made between actuator units and equipment units for the purpose of clarity only. The term actuator unit is used to indicate units that transmit messages to other units when they change state. Equipment unit is used for units receiving messages.

The central unit 30, in its most simple form, is charged with the assignment of unit addresses only. Each of the equipment and actuator units comprise a programmable address memory and means to communicate with the central unit. When the system is initialized, each of the equipment and actuator units will transmit initializing messages to the central unit and in response they will receive their unit address. The unit address is subsequently stored in a programmable address memory. Preferably unit addresses are unique, but also the same address can be assigned to different units that operate completely in parallel. As the system should be resistant against power failure, the memories are preferable of a non-volatile type, for example EEPROM. Inserting a new equipment Or actuator unit has as initially as effect that the new unit will be given a unit address only. In a stable configuration the central unit 30 may be switched off or disconnected.

Rather than a common memory unit 31, connected in the system in a preferred embodiment each actuator unit is provided with its own associated memory containing the table of equipment unit addresses. The advantage of this embodiment is that the common communication channel 10 is not used for messages from the actuator units towards the memory units 31.

Figure 2:
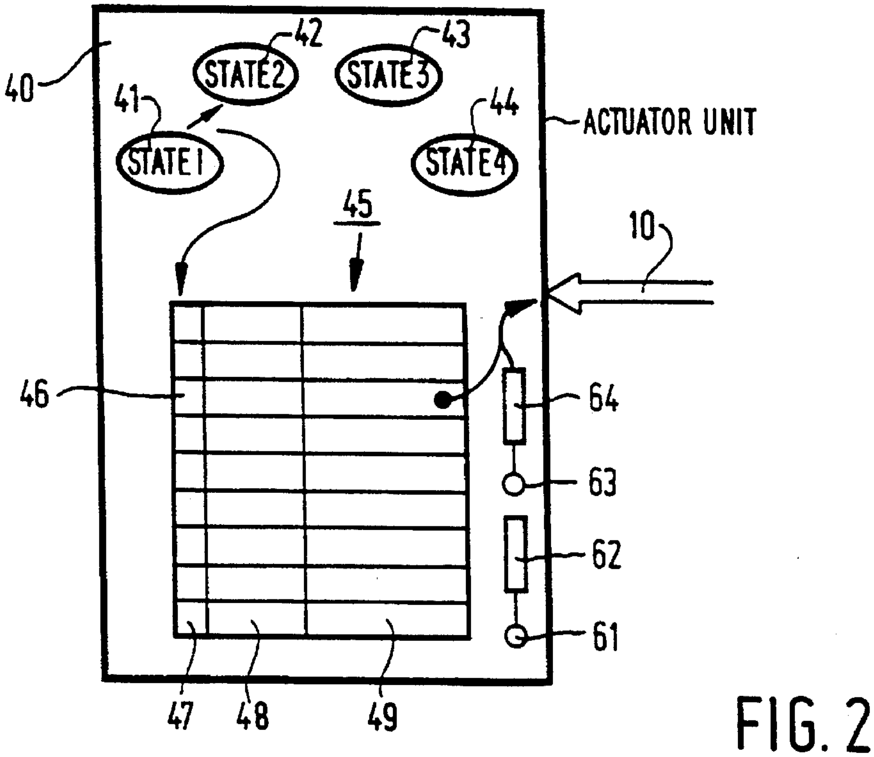
FIG. 2 a functional representation of an actuator unit.

In FIG. 2 a functional diagram of an actuator unit 40 is shown in more detail. The actuator unit 40 can be in one of several states 41, 42, 43 or 44. When, by some influence an 'event' occurs, i.e. the state of the actuator changes, shown in the Figure by an arrow indicating a change from state 41 to state 42, an internal signal corresponding to this change is generated. The influence causing the change of state is, for example, a person turning a knob, a temperature reaching a predetermined value or the lapse of a time interval. The internal signal is compared with the contents of a column 'events' 47 in an 'event table' 45. When a match is found in the event table between the type of event that occurred and an entry 46 in the 'events' column 47, messages in the event table 45 that are linked with said entry 46 are transmitted via the common communication channel 10. These messages comprise the destination addresses, i.e. the unit addresses of the equipment units, as stored in column 48 and possible further instructions for the addressed equipment as stored in column 49 in the event table 45.

Figure 3:
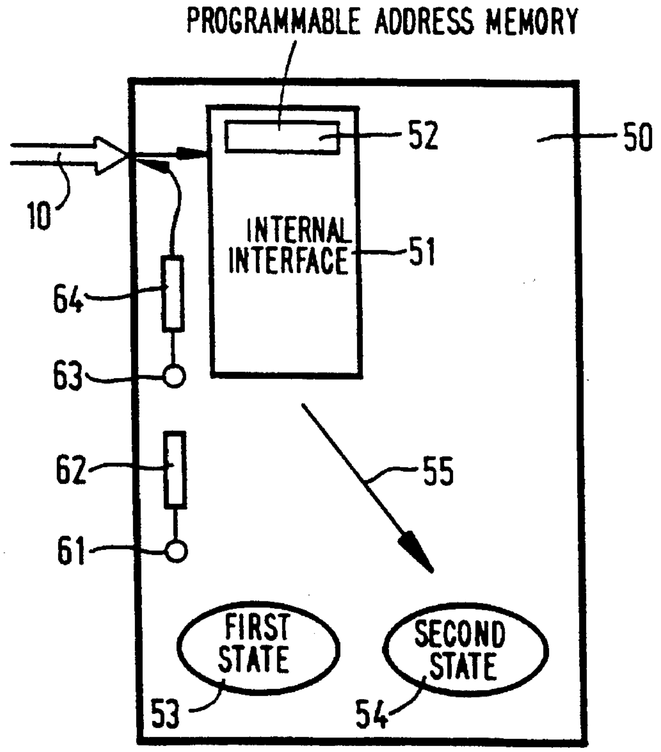
FIG. 3 a functional representation of an equipment unit.

A functional diagram of an equipment unit 50 is shown in FIG. 3. The unit 50 is connected to the common communication channel 10 via an internal interface 51. The unit can be in one of several states, shown are a first state 53 and a second state 54, for example "on" and "off". When a message is received via the common communication channel 10, it is analyzed in the interface circuit 51. Firstly the destination address comprised in the message is compared with the unit address as stored in the programmable address memory 52. Only if the two match, the message will affect the state the equipment unit is in. The change of state may be implicit or explicit. With an implicit change is meant that the mere receipt of the message will cause the present state to be changed to the other state. For an explicit change of state the message comprises an instruction, following that instruction the equipment unit changes to a particular state contained in the instruction. No change of state occurs if the equipment unit was already in the particular state. The Figure suggests a change to the second state 54, indicated by arrow 55.

The equipment unit 50 may comprise further the circuitry of an actuator unit. In particular it may comprise a programmable memory with an event table 45 and means to select addresses and messages from the event table and transmit them via the common communication channel 10 if the equipment unit changes state. The change of state can be reported back to the actuator unit from which the message originated and to other parts of the system.

In order to fill the event table 45 in the programmable memories of the actuator and equipment-units, each unit is provided with a first switch 61,-mark-switch. Activating this switch causes a mark-register 62 to-be set. As indicated in FIGS. 2 and 3 the register 62 may be located in the unit and be, for example a flip-flop. When a second switch 63, the link-switch, on one of the units is activated, a link-signal generator 64 sends a link-signal via the common communication channel 10, causing all Units in the system to be scanned and the addresses of those units of which the mark-register 62 is set to be loaded into the event table 45 associated with the unit of which the link switch 63 is activated. By this flexible and simple procedure a logical connection is established between actuator and equipment units. As an alternative, the unit address of the unit of which the link switch 63 is activated can be added to the event tables of the units of which the mark-register 62 is set.

In addition to storing the unit addresses in destination fields 48 of the event table 45, this table may comprise message fields 49. The message fields 49 contain, for example, an identification of the state of the unit of which the mark-register is set at the moment the mark switch is activated or at the moment the link-signal is generated. When the actuator unit changes state, the state stored in the message field 49 will be transmitted to the equipment unit with the stored address and this equipment unit will thereby be instructed to change its state to the state it had when the logic connection between actuator unit and equipment unit was established. The main advantage of the system according to the invention is that by this procedure the actuator units need to have no prior knowledge about the equipment units. Instructions for the equipment units are retrieved from the equipment units or from elsewhere and stored in the programmable memory or event table of the actuator unit in a format that has no meaning for the actuator, but has a meaning for the equipment unit.

Figure 4:
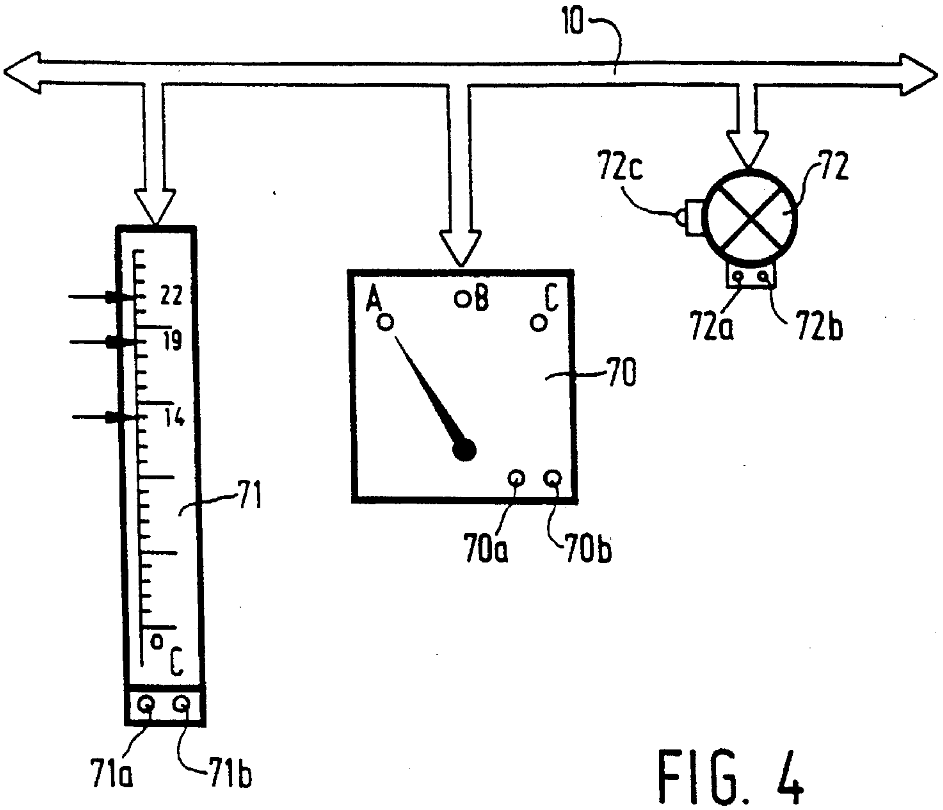
FIG. 4 a system with a thermostat, two lights and a three-state switch.

By way of example, this is illustrated in FIG. 4. An actuator unit 70 is a three-state switch with states "A", "B", and "C", and a mark switch 70*a* and a link switch 70*b* the equipment unit is a thermostat 71 having a mark switch 71*a* and a link switch 71*b*, a further equipment unit is light 72 having a mark switch 72*a* and a link switch 72*b*. The thermostat 91 is set at a nominal temperature of 14° C., light 72 is switched off by means of a local switch 92*c* and the three-state switch 70 is set at state "A". Now a logical connection is made by activation of the mark-switches 71*a* and 72*a* of the thermostat 71 and of the light 72 and subsequently of the link-switch 70*b* of the three-state switch 70. The same procedure is repeated for a nominal temperature of 22° C. at the thermostat, light 72 switched on and the three-state switch in state "C". In the third state "B" of the three-state switch 70 the nominal temperature of the thermostat is 19° C., and only the thermostat is connected, using mark-switch 71*a* and link-switch 90*b*, not the light 72. After this initialization procedure turning the three-state switch to state "A" will cause light 72 to be switched off and the thermostat to regulate the temperature to 14° C.. Moving the three-state switch 70 to state "B" causes the thermostat to regulate the temperature to 19° C. but will not change the state of the light 72. State "C" of the three-state-switch 70 will switch on light 72 and regulate the temperature to 22° C.

Figure 5:
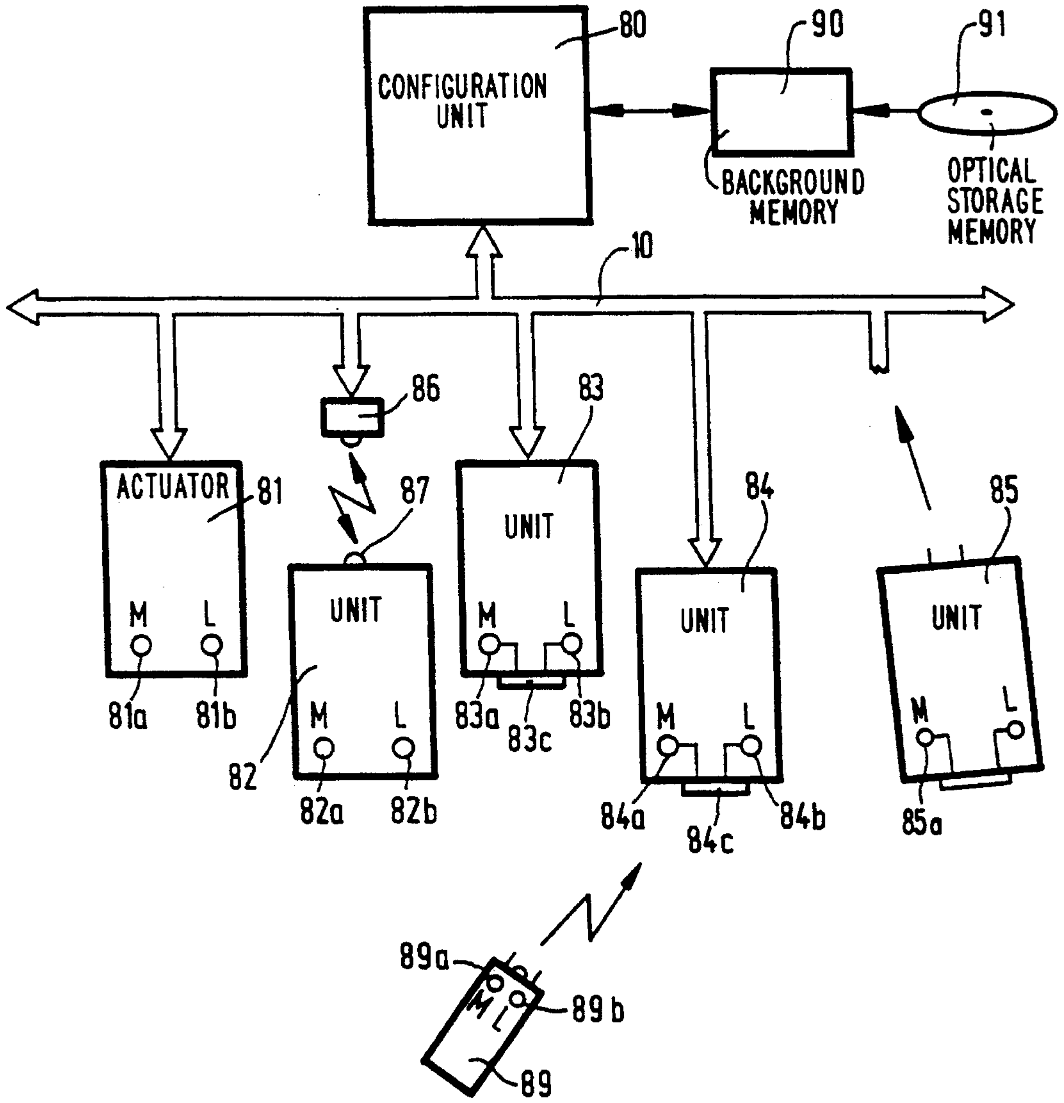
FIG. 5 a further embodiment of a system in accordance with the invention.

A system such as described in relation to FIG. 4 allows to connect logically equipment and actuator units that cannot cooperate usefully with each other, for example a pair of lights or a pair of motion detectors. In FIG. 5 an embodiment of a system in accordance with the invention is shown, which embodiment comprises a separate configuration unit 80. The configuration unit 80 serves to assign unit addresses to the equipment and actuator units 81, 82, 83, respectively and 84 and makes it possible to limit connections between units to connections that are useful. The actuator and equipment units are provided with mark-switches 81*a*, 82*a*, 83*a* and 84*a* and link-switches 81*b*, 82*b*, 83*b* and 84*b*, respectively.

Initializing the system or adding a new equipment or actuator unit to the system proceeds as follows. When a new unit 85 is added to the system, the new unit will transmit a message to the configuration unit 80 via the common communication channel 10. The configuration unit 80 has a predetermined address which is known to the new unit. With this message the new unit 85 will make itself known to the configuration unit 80 and also indicate of which type it is, for example, switch, thermostat, light or television-set. In response to this message, a message is returned by the configuration unit 80 communicating the unit address of the new unit 85 to it. This unit address is stored internally in the new unit.

As mentioned before, each unit is associated with a further programmable memory containing the event table, preferably comprised inside the unit. Cooperation between units is established by filling the event table with addresses and, if relevant, with instructions. Analogous to the embodiment described before, cooperation between an actuator unit 81 and a plurality of equipment units 83, 84 and 85 is established by the following procedure. The mark-switches 83*a*, 84*a* and 85*a* of the equipment units are activated. Activation of mark-switch 83*a* causes the unit 83 to transmit a mark-message to the configuration unit 80, which message comprises the type of the unit, the unit address and the present state of the unit 83. When the configuration unit 80 has knowledge about the type of unit associated with the address, the type information needs not to be transmitted. The unit 83 is now marked by storing its address, state and type in a memory in the configuration unit 80. The other unit 84 and 85 are marked analogous by activating the mark-switches 84*a* and 85*a*, respectively, thereby building a table of marked units in the configuration unit.

The actuator unit 81, to be coupled with the equipment units 83, 84 and 85, is selected by means of activating its link-switch 81*b*. This causes a link-message to be transmitted to the configuration unit 80. The link message comprising the type of unit 81, its address and the state it is in. Subsequently, an event table will be generated by configuration unit 80 with as input the table of marked units 83, 84 and 85 and the contents of the link-message from unit 81. As further input an interface description between any pair of marked and linked unit types can be used. The interface description contains the behavior between a pair of unit types when cooperating. Without an interface description for a particular pair of unit types, no entry will be generated in the event table. The interface description, together with the states of the two units is assembled to form the instruction to be entered in the event table. After the entries for the event table are assembled, the entries are transmitted via the common communication channel 10 to the actuator unit 81 associated with the link signal, to replace, update or supplement the existing event table. An analogous procedure can be performed when the mark-signals originate from actuator units and the link-signal is generated in an equipment. In addition to amending the event table of the unit generating the link-signal, also the event tables in the marked units may be updated with address and instruction for the linking unit. This allows a cross-link and return communication between the units.

The interface descriptions are available from a background memory 90 connected to the configuration unit 80. The contents of the background memory should be replaceable, for example when new types of equipment and actuator units become available. Preferably, the background memory is an exchangeable magnetic or optical storage medium 91, such as a floppy disc, a CD-ROM, a card with a magnetic strip or a building semiconductor chip memory. Alternatively, the configuration unit contains an erasable memory, for example a built-in magnetic disc or semi-conductor memory, that can be updated from an exchangeable medium.

Alternatively to activating mark- and link-switches that are physically connected with the actuator and equipment units, the mark and link signals may be generated by means of a remote control unit 89. The remote control unit 89 cooperates with detectors in the actuator and equipment units. In FIG. 5, units 83 and 84 are provided with detectors 83*c* and 84*c*, respectively. Preferably, the remote control unit 89 is of the "point and shoot" type having a narrow beam. Aiming the remote control unit 89 towards the detector, 83*c* or 84*c*, and activating the mark button 89*a* or the link-button 89*b*, activates the mark or link signal generating circuit connected to detectors 83*c* and 84*b* in the units 83 and 84, respectively. A "point and shoot" type of remote control unit makes it unnecessary to provide buttons on the remote control unit to identify the equipment or actuator by means of an address and, more importantly, it relieves the user of the need to memorize those addresses or look for them beforehand. The common communication channel 10 may comprise a variety of transmission possibilities. In FIG. 5 the connection of unit 82 is partially via two-way infra-red communication, indicated by a IR-transmitter/receiver 86 connected to the common communication channel 10 and a transmitter/receiver 87 connected to the unit 82.

In the described embodiments the means to mark and link the units in creating a system configuration use the same common communication channel 10 as the messages between the actuator and equipment units when the system is operating normally. As the configuration unit is only needed during initialization or when the configuration needs to be changed a different communication channel may be used for this purpose. For example, the common communication channel 10 may be a wired bus, and the configuration unit is a portable device communicating with each of the units by means of two-way IR. A "point and shoot" remote control unit can be integrated with this portable device. Marking and linking units will cause not a mark-link signal on the common communication channel but transmitting the mark- and link-signals to the portable configuration unit wirelessly and the assembled event table is transmitted along the same route.

Figure 6:
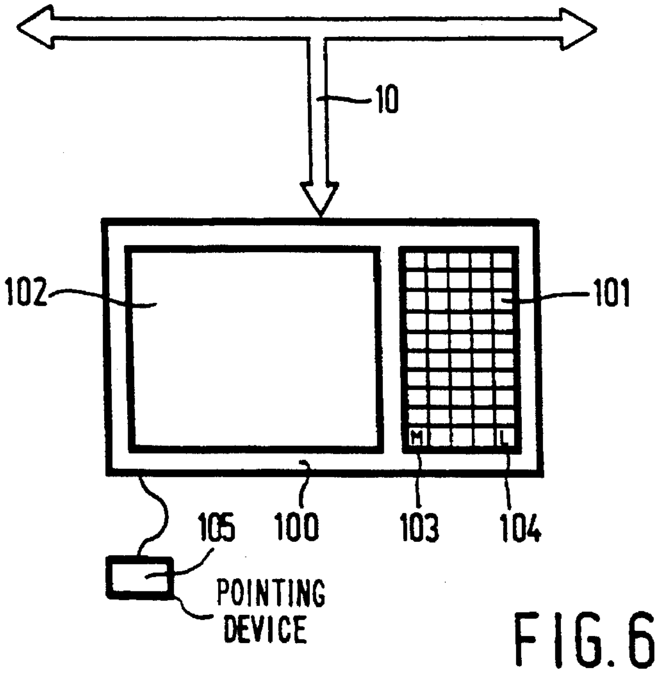
FIG. 6 a graphical user interface for use in a system according to the invention.

In FIG. 6 a graphic interface is illustrated to facilitate interaction of a user with the equipment control system. Considered from the system the graphical user interface 100 is a combination of an actuator unit and an equipment unit, not unlike other units. The graphical interface contains a keypad 101 and/or a pointing device 105 and a screen 102, for example an LCD-screen. The screen and input devices may be integrated, for example in a touch-sensitive screen. The graphical interface comprises further a programmable memory, for storing an event table. During initialization the graphical user interface 100 is logically connected to all equipment and actuator units in the system or to all units in a functional portion of the system, for example all units in a particular room or in a section of a building. For this end, the user interface comprises means for remotely marking all units in the system and generating a link signal for itself. The programmable memory in the graphical user interface 100 comprises an extended event table. The programmable memory may further comprise a table of unit addresses and names or labels or icons for all equipment and actuator units in the functional portion of the system coupled to the graphical user interface. Initially the names are assigned by the system, and divided, for example, of a combination of type and a number. The labels or icons can be changed via the keypad 101. Instructions in the extended event table do not only cause an equipment unit to change state, but may cause other changes in the equipment or actuator units. In combination with "mark" and "link" keys 103 and 104 on the keypad 101, and with the label attached to each equipment and actuator unit the units can be remotely caused to generate mark- and link-signals.

If the equipment and actuator units themselves are also provided with a programmable memory containing such name, in addition to the unit address, a change in the name of a unit entered by a user via a graphical user interface, will cause the name in the equipment or actuator unit to be changed. This change of name is handled in the unit as a change in state and causes further messages to be sent to inform all other relevant units about the change of name. Consequently, entering a new name via one graphical user interface will change the name on all displays in the whole system. In the same way a change in operational state of an equipment or actuator unit is communicated to the graphical user interface 100 and made visible by a symbol on the screen 102. The screen will show all units, or a selected portion, in their present states.

In the system according to the invention the only information that an equipment and actuator unit contains about other equipment and actuator units is comprised in the event table. The event table is filled with instructions for other units, these instructions are loaded or changed when the system is initialised or reconfigured. The instructions have no meaning to the unit in the programmable memory of which they are stored. As no prior knowledge of the other units is present, the system is very flexible in adding new units, even of a hitherto unknown type. In a preferred embodiment the central or configuration unit is only needed during initialisation or reconfiguration. No messages are send to or received from the central unit during normal operation.

We claim:

1. A distributed system for equipment control, comprising:

A) a communication channel;

B) a plurality of equipment units each having an associated equipment unit address and coupled to the communication channel, each said equipment unit comprising a first memory for storing its own unit address and mark means for marking itself in response to a mark signal, C) means for generating a mark signal, D) a plurality of actuator units each having a plurality of states and an associated actuator unit address and coupled to the communication channel, each said actuator unit comprising:

(a) an associated programmable second memory for storing:

(i) at least one actuator message, (ii) a plurality of equipment unit addresses at least equal in number to the number of said plurality of equipment units, (b) means for accessing the second memory, (c) means for changing the state of the actuator unit,.

E) means for generating on the communication channel a link signal linked to a given actuator unit, F) coupling means in response to the link signal being generated for storing in the programmable memory of the given actuator unit the unit address of the equipment unit of each marked equipment unit, G) said actuator unit further comprising means in response to the changing of its state for transmitting on to the communication channel an actuator message destined for one or more of the equipment units ,whose address is stored in the second memory.

2. A system as claimed in claim 1, further comprising:

H) a display screen,

I) a data entry device,

J) means for remotely generating mark signals destined for particular equipment units and link signals, K) means for displaying on the display screen the actuator units and the equipment units whose addresses are stored in the respective second memories of the actuator units.

3. A distributed system for equipment control, comprising:

A) a communication channel;

B) a plurality of equipment units each having an associated equipment unit address and coupled to the communication channel, each said equipment unit comprising a first memory for storing its own unit address, C) means for generating a mark signal, D) a plurality of actuator units each having a plurality of states and an associated actuator unit address and coupled to the communication channel, each said actuator unit comprising:

(a) an associated programmable second memory for storing:

(i) at least one actuator message, (ii) a plurality of equipment unit addresses at least equal in number to the number of said plurality of equipment units, (b) means for accessing the second memory, (c) means for changing the state of the actuator unit, (d) mark means for marking itself, E) means for generating on the communication channel a link signal linked to a given equipment unit, F) coupling means in response to the link signal being generated for storing in the programmable memory of each marked actuator unit the unit address of the given equipment, G) said actuator unit further comprising means in response to the changing of its state for transmitting on to the communication channel an actuator message destined for one or more of the equipment units whose address is stored in the second memory.

4. A system as claimed in claim 3, further comprising:

H) a display screen,

I) a data entry device,

J) means for remotely generating mark signals destined for particular equipment units and link signals, K) means for displaying on the display screen the actuator units and the equipment units whose addresses are stored in the respective second memories of the actuator units.

5. A distributed system for equipment control comprising:

A) a communication channel;

B) a plurality of equipment units each having an associated equipment unit address and coupled to the communication channel, each said equipment unit comprising a programmable first memory for storing its own unit address and other unit addresses and mark means for marking itself in response to a mark signal, C) means for generating a mark signal, D) a plurality of actuator units each having a plurality of states and an associated actuator unit address and coupled to the communication channel, each said actuator unit comprising:

(a) an associated programmable second memory for storing:

(i) at least one actuator message, (ii) a plurality of equipment unit addresses at least equal in number to the number of said plurality of equipment units, (b) means for accessing the second memory, (c) means for changing the state of the actuator unit, d) mark means for marking itself in response to a mark signal, E) means for generating on the communication channel a marking signal destined for certain equipment units and a link signal linked to a given actuator unit, F) coupling means in response to the link signal being generated for storing in the programmable memory of the given actuator unit the unit address of the equipment unit of each marked equipment unit, G) said actuator unit further comprising means in response to the changing of its state for transmitting on to the communication channel an actuator message destined for one or more of the equipment units whose address is stored in the second memory.

6. A system as claimed in claim 5, further comprising a remote control unit for actuating the means for generating the marking signal and the linking signal.

7. A system as claimed in claim 5, further comprising a configuration unit for actuating the means for generating the marking signal and the linking signal.

8. A system as claimed in claim 5, further comprising a configuration unit for assigning unit addresses to equipment units and actuator units.

9. A system as claimed in claim 5, further comprising a configuration unit for distributing messages to be stored in the second memory.

10. In a distributed system for equipment control wherein the system comprises:

A) a communication channel;

B) a plurality of equipment units each having a memory and an associated equipment unit address and coupled to the communication channel, C) a plurality of actuator units each having a plurality of states and a programmable memory and an associated actuator unit address and coupled to the communication channel, the method for logically coupling a group of said actuator units to a group of said equipment units for allowing communications between an actuator unit when it changes its state and selected ones of the equipment unites, comprising:

a) marking a first group of said units by storing a marking signal in all units in said first group, b) providing a linking signal linked to one of the actuator units to a second group of said units to cause interrogation of other units for identifying those that have a stored marking signal, c) in response to identifying an equipment unit storing a marking signal, storing in the programmable memory of said one actuator unit the unit address of each said equipment unit storing a marking signal thereby logically coupling each said equipment unit storing a marking signal to said one actuator unit, d) storing in the programmable memory of said one actuator unit a message destined for one of the logically coupled equipment units, e) in response to said one actuator unit changing its state, placing on the communication channel said message including the address of said one equipment unit.

11. In a distributed system for equipment control wherein the system comprises:

A) a communication channel;

B) a plurality of equipment units each having a memory and an associated equipment unit address and coupled to the communication channel, C) a plurality of actuator units each having a plurality of states and a programmable memory and an associated actuator unit address and coupled to the communication channel, the method for logically coupling a group of said actuator units to a group of said equipment units for allowing communications between an actuator unit when it changes its state and selected ones of the equipment units, comprising:

a) marking a first group of said units by storing a marking signal in all units in said first group, b) providing a linking signal linked to one of the equipment units to a second group of said units to cause interrogation of other units for identifying those that have a stored marking signal, c) in response to identifying an actuator unit storing a marking signal, storing in the programmable memory of said actuator unit the unit address of said one equipment unit thereby logically coupling each said actuator unit storing a marking signal to said one equipment unit, d) storing in the programmable memory of one of the actuator units a message destined for one of the logically coupled equipment units, e) in response to said one actuator unit changing its state, placing on the communication channel said message including the address of said one equipment unit.

* * * * *